(12) United States Patent
Sasada et al.

(10) Patent No.: US 10,059,372 B2
(45) Date of Patent: Aug. 28, 2018

(54) WORK VEHICLE

(71) Applicant: KOMATSU LTD., Tokyo (JP)

(72) Inventors: Atsushi Sasada, Tokyo (JP); Hiroaki Takeshima, Tokyo (JP); Osamu Takatori, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/511,069

(22) PCT Filed: Nov. 2, 2016

(86) PCT No.: PCT/JP2016/082672
§ 371 (c)(1),
(2) Date: Mar. 14, 2017

(87) PCT Pub. No.: WO2017/047827
PCT Pub. Date: Mar. 23, 2017

(65) Prior Publication Data
US 2018/0118261 A1 May 3, 2018

(51) Int. Cl.
*B60W 10/02* (2006.01)
*B62D 11/08* (2006.01)
(Continued)

(52) U.S. Cl.
CPC .............. *B62D 11/08* (2013.01); *B60T 17/22* (2013.01); *B60W 10/06* (2013.01);
(Continued)

(58) Field of Classification Search
CPC ............ B62D 11/08; B60T 7/12; B60T 7/107

USPC .............. 303/3, 9.62, 13, 15, 20; 188/106 F; 180/6.44, 6.48, 6.7, 244; 192/12 R, 13 R; 701/42

See application file for complete search history.

(56) References Cited

U.S. PATENT DOCUMENTS 6,017,101 A * 1/2000 Matsuda ................... B60T 7/12
  180/169
6,199,670 B1 3/2001 Shirai et al.
(Continued)

FOREIGN PATENT DOCUMENTS

JP 2006-327587 A 12/2006
JP 2010-144816 A 7/2010
(Continued)

OTHER PUBLICATIONS

The International Search Report for the corresponding international application No. PCT/JP2016/082672, dated Dec. 13, 2016.

*Primary Examiner* — Christopher P Schwartz
(74) *Attorney, Agent, or Firm* — Global IP Counselors, LLP (57) ABSTRACT

A bulldozer is provided with left and right steering brakes that brake the rotations of left and right drive wheels, and a control unit for hydraulically controlling the braking state of the respective left and right steering brakes. The control unit executes protection processing on the left steering brake or the right steering brake when a state of the degree of engagement of the left steering brake or the right steering brake being within a predetermined range and the vehicle speed being equal to or greater than a predetermined vehicle speed continues for a predetermined time.

20 Claims, 5 Drawing Sheets

(51) Int. Cl.
  *B60T 17/22*  (2006.01)
  *B60W 10/06*  (2006.01)
  *B60W 10/196* (2012.01)
  *B60W 50/02*  (2012.01)
  *E02F 9/20*   (2006.01)
  *E02F 9/26*   (2006.01)
  *E02F 9/22*   (2006.01)

(52) U.S. Cl.
  CPC ...... *B60W 10/196* (2013.01); *B60W 50/0205* (2013.01); *B60W 2050/021* (2013.01); *B60W 2300/17* (2013.01); *B60W 2710/0644* (2013.01); *E02F 9/2066* (2013.01); *E02F 9/226* (2013.01); *E02F 9/26* (2013.01); *E02F 9/268* (2013.01)

(56) References Cited

U.S. PATENT DOCUMENTS

| | | | |
|---|---|---|---|
| 6,283,263 B1 * | 9/2001 | Ibuki | B62D 11/08 180/6.7 |
| 9,079,613 B1 * | 7/2015 | Yoshikawa | B62D 11/08 |
| 2004/0113486 A1 * | 6/2004 | Koga | B60T 7/107 303/20 |
| 2015/0217805 A1 | 8/2015 | Yoshikawa et al. | |

FOREIGN PATENT DOCUMENTS

| | | |
|---|---|---|
| JP | 2013-231324 A | 11/2013 |
| JP | 2014-205409 A | 10/2014 |

\* cited by examiner

WORK VEHICLE

CROSS-REFERENCE TO RELATED APPLICATIONS

This application is a U.S. National stage application of International Application No. PCT/JP2016/082672, filed on Nov. 2, 2016.

BACKGROUND

Field of the Invention

The present invention relates to a work vehicle.

Background Information

A bulldozer, which is one type of work vehicle, turns to the right and left through the hydraulic control of steering clutches and steering brakes corresponding to respective left and right drive wheels.

A method for reducing the output of the engine when a heat generation rate derived from the output rotation speed and the brake hydraulic pressure is equal to or greater than a threshold has been proposed in order to control the thermal load on the steering brakes which are in a half-engaged state during turning (see Japanese Laid-open Patent Publication No. 2013-231324).

SUMMARY

However, because the duration time of the half-engaged state is not considered when detecting the thermal load on the steering brakes in a simple manner in the method described in Japanese Laid-open Patent Publication No. 2013-231324, there is a limit to the suppression of the thermal load on the steering brakes.

In consideration of the above problem, an object of the present invention is to provide a work vehicle that is capable of suppressing thermal loads on steering brakes.

A work vehicle according to the present invention has an engine, a drive wheel, a power transmission device, a steering brake, and a control unit. The power transmission device is configured to transmit power of the engine to the drive wheels. The steering brake is disposed between the drive wheel and the power transmission device and configured to brake a rotation of the drive wheel. The control unit is configured to control a degree of engagement of the steering brake. The control unit is configured to execute protection processing on the steering brake when a state of the degree of engagement of the steering brake being within a predetermined range continues for a predetermined time.

According to the present invention, there is provided a work vehicle that is capable of suppressing thermal loads on the steering brakes.

DETAILED DESCRIPTION OF EXEMPLARY EMBODIMENTS

Overall Configuration of a Bulldozer 1

Figure 1:
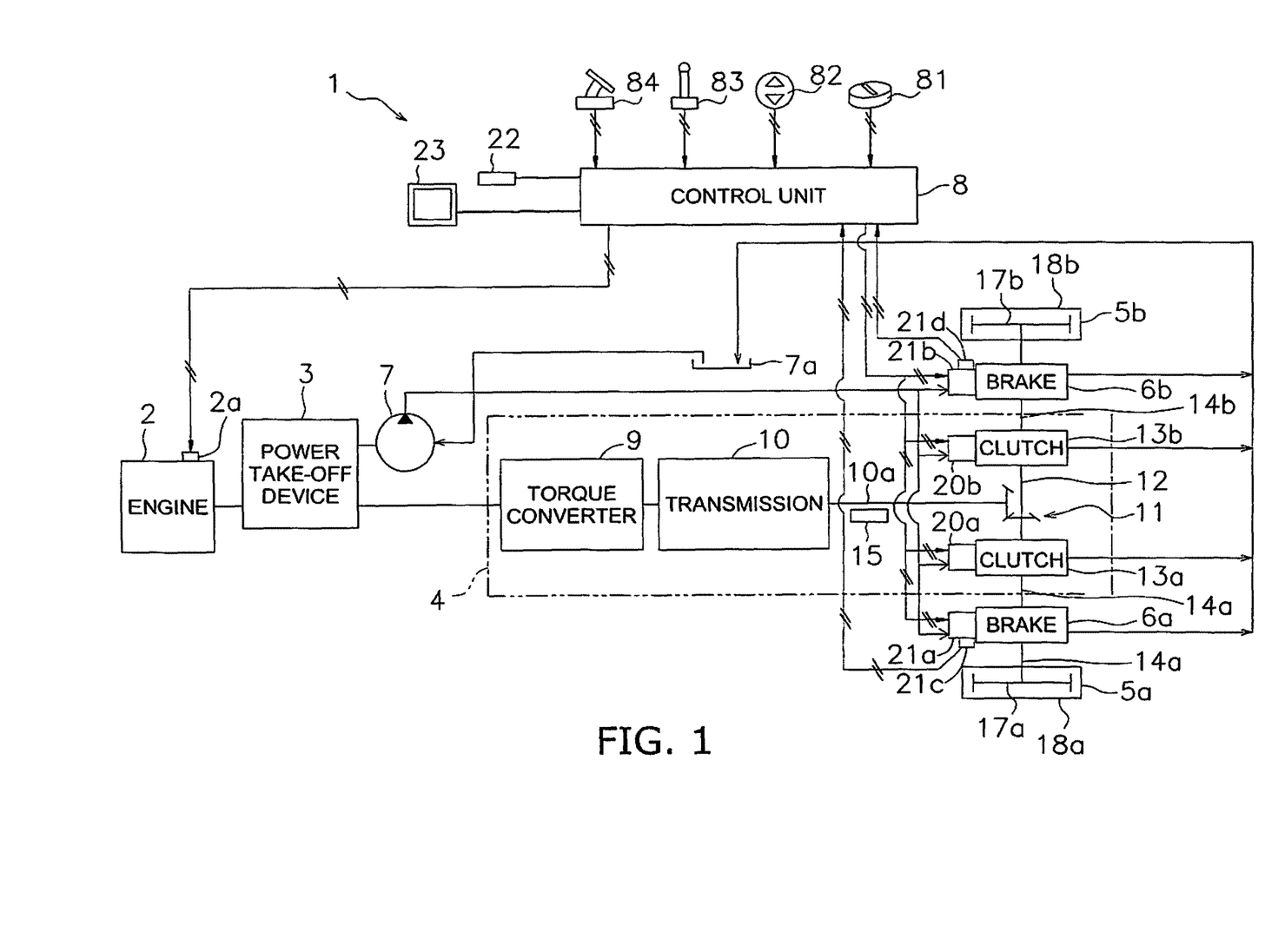
FIG. 1 is a system configuration of a bulldozer according to an exemplary embodiment.

FIG. 1 is a system configuration of a bulldozer 1 according to an exemplary embodiment. The bulldozer 1 is provided with an engine 2, a power take-off device 3, a power transmission device 4, left and right travel devices 5a, 5b, left and right steering brakes 6a, 6b, a hydraulic pump 7, and a control unit 8.

Power from the engine 2 is transmitted to the power take-off device 3. The power take-off device 3 distributes the power from the engine 2 to the power transmission device 4 and the hydraulic pump 7.

The power transmission device 4 transmits the power from the engine 2 transmitted from the power take-off device 3 to the left and right travel devices 5a, 5b. The power transmission device 4 has a torque converter 9, a transmission 10, a bevel gear 11, an input shaft 12, left and right steering clutches 13a, 13b, left and right output shafts 14a, 14b, and a rotation speed detecting unit 15.

The torque converter 9 is coupled to the power take-off device 3 and the transmission 10. The torque converter 9 transmits the power from the power take-off device 3 to the transmission 10 through a fluid. The transmission 10 changes the speed of the rotation motion transmitted from the torque converter 9. The transmission 10 is able to switch between forward travel and reverse travel. An output shaft 10a of the transmission 10 is coupled to the bevel gear 11. The power output from the transmission 10 is transmitted through the bevel gear 11 to the input shaft 12. The input shaft 12 is coupled to the left and right steering clutches 13a, 13b.

Each of the left and right steering clutches 13a, 13b are wet multiplate clutches that can be switched between an engaged state and a non-engaged state through hydraulic pressure. The left and right steering clutches 13a, 13b are coupled to the left and right output shafts 14a, 14b. When the left steering clutch 13a is in the engaged state, the power from the input shaft 12 is transmitted to the left output shaft 14a. When the right steering clutch 13b is in the engaged state, the power from the input shaft 12 is transmitted to the right output shaft 14b.

The left and right output shafts 14a, 14b are coupled to the left and right travel devices 5a 5b. The left travel device 5a has a left drive wheel 17a and a left crawler belt 18a. The left drive wheel 17a is coupled to the left output shaft 14a. The left crawler belt 18a is wound around the left drive wheel 17a. When the left drive wheel 17a is rotated by the left output shaft 14a, the left crawler belt 18a is driven accompanying the rotation. The right travel device 5b has a right drive wheel 17b and a right crawler belt 18b. The right drive wheel 17b is coupled to the right output shaft 14b. The right crawler belt 18b is wound around the right drive wheel 17b. When the right drive wheel 17b is rotated by the right output shaft 14b, the right crawler belt 18b is driven accompanying the rotation.

The rotation speed detecting unit 15 detects the rotation speed of the output shaft 10a coupled to the transmission 10. The rotation speed detecting unit 15 sends the detected rotation speed of the output shaft 10a to the control unit 8.

The left and right steering brakes 6a, 6b are disposed between the power transmission device 4 and the respective left and right drive wheels 17a, 17b. The left and right steering brakes 6a, 6b brake the rotations of the left and right drive wheels 17a, 17b. Each of the left and right steering brakes 6a, 6b is a wet multiplate negative brake that can be switched between a braking state and a non-braking state through hydraulic pressure. The left steering brake 6a brakes the rotation of the left output shaft 14a in a half-engaged state (incomplete engagement) or fully engaged state, and does not brake the left output shaft 14a in the non-engaged state. The right steering brake 6b brakes the rotation of the right output shaft 14b in a half-engaged state (incomplete engagement) or fully engaged state, and does not brake the right output shaft 14b in the non-engaged state.

The hydraulic pump 7 is driven by power from the engine 2. The hydraulic pump 7 sucks in hydraulic fluid stored in a hydraulic fluid tank 7a and supplies the hydraulic fluid to the left and right steering clutches 13a, 13b and the left and right steering brakes 6a, 6b. The hydraulic pressure of the hydraulic fluid supplied to the left and right steering clutches 13a, 13b is controlled by left and right steering clutch control valves 20a, 20b. The hydraulic pressure of the hydraulic fluid supplied to the left and right steering brakes 6a, 6b is controlled by left and right steering brake control valves 21a, 21b. Left and right hydraulic pressure sensors 21c, 21d for detecting the hydraulic pressure of the hydraulic fluid supplied to the left and right steering brakes 6a, 6b, are attached to the left and right steering brake control valves 21a, 21b. The hydraulic fluid that has passed through the left and right steering clutches 13a, 13b and the left and right steering brakes 6a, 6b is recovered in the hydraulic fluid tank 7a.

The control unit 8 receives operation signals from a throttle operating unit 81, a speed change operating unit 82, a steering operating unit 83, and a braking operating unit 84. The throttle operating unit 81 outputs operation signals indicating the rotation speed of the engine 2. The speed change operating unit 82 outputs operation signals indicating the velocity stages of the transmission 10. The steering operating unit 83 outputs operation signals indicating the turning direction and the turning radius. The braking operating unit 84 outputs operation signals indicating the acceleration and deceleration of the bulldozer 1.

The control unit 8 sends a fuel injection amount command signal to an electronic control fuel injection device 2a in response to the operation amount of the throttle operating unit 81. The electronic control fuel injection device 2a controls the rotation speed of the engine 2 by determining the injection amount command signal and adjusting the injection amount of the fuel to be injected into a cylinder. The control unit 8 controls the velocity stages of the transmission 10 in response to the operating position of the speed change operating unit 82.

The control unit 8 controls the hydraulic pressure of the hydraulic fluid supplied to the left and right steering clutches 13a, 13b and the left and right steering brakes 6a, 6b by outputting hydraulic control signals corresponding to the operation amount of the steering operating unit 83 to the left and right steering clutch control valves 20a, 20b and the left and right steering brake control valves 21a, 21b. The control unit 8 acquires the hydraulic pressure of the hydraulic fluid supplied to the left and right steering brakes 6a, 6b from the left and right hydraulic pressure sensors 21c, 21d.

For example, during a gentle left turn, the control unit 8 sets the left steering brake 6a to the half-engaged state and the right steering brake 6b to the non-engaged state, and sets the left steering clutch 13a to the non-engaged state and the right steering clutch 13b to the engaged state. At this time, the thermal load on the left steering brake 6a that is connected for a long time in this state increases because slippage of the left steering brake 6a in the half-engaged state occurs, and there is a concern that the left steering brake 6a may become damaged.

Accordingly, the control unit 8 executes the protection processing on the left steering brake 6a when a state of a large thermal load continues for a predetermined time. In the present exemplary embodiment, the control unit 8 notifies the operator that the thermal load on the left steering brake 6a has increased as the protection processing. Specifically, the control unit 8 issues a notification sound from a notifying unit 22 and displays a notification display (illumination or notification message and the like) on a display 23. Details of the protection processing are explained below.

The control unit 8 hydraulically controls the braking state and the non-braking state of the respective left and right steering brakes 6a, 6b by outputting hydraulic pressure control signals corresponding to the operation amount of the braking operating unit 84 to the left and right steering brake control valves 21a, 21b.

The control unit 8 acquires the rotation speed of the output shaft 10a from the rotation speed detecting unit 15. The control unit 8 detects the vehicle speed of the bulldozer 1 on the basis of the rotation speed of the output shaft 10a.

Protection Processing of Left and Right Steering Brakes 6a, 6b

Figure 2:
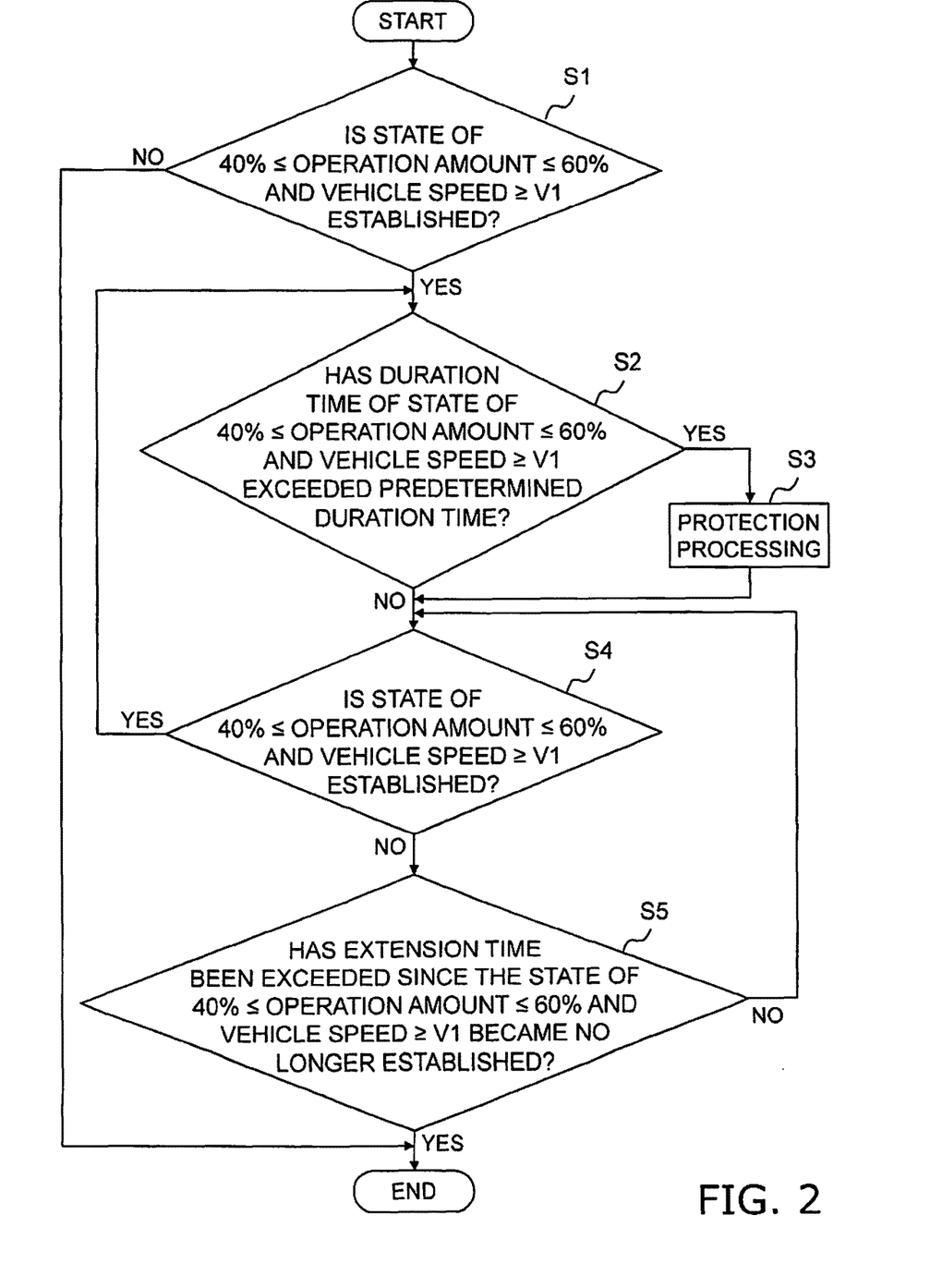
FIG. 2 is a flow diagram illustrating protection processing of left and right steering brakes according to the exemplary embodiment.
Figure 3A:
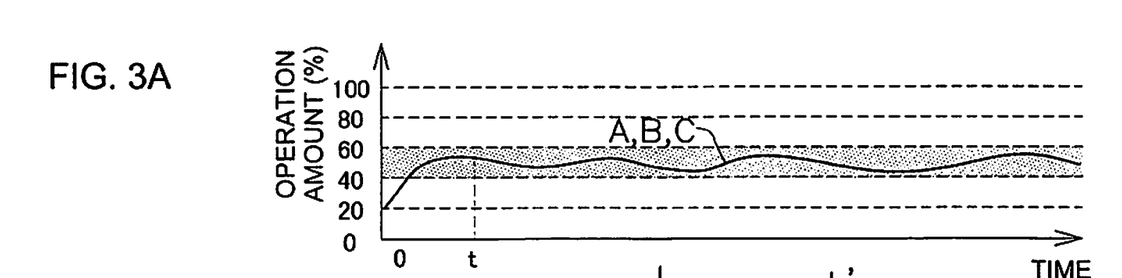
FIGS. 3A-3C include graphs pertaining to the left or right steering brake according to the exemplary embodiment.
Figure 3B:
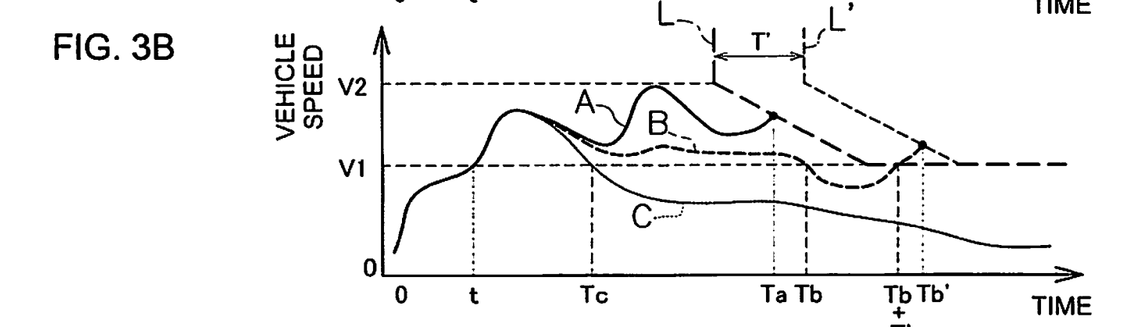
Figure 3C:
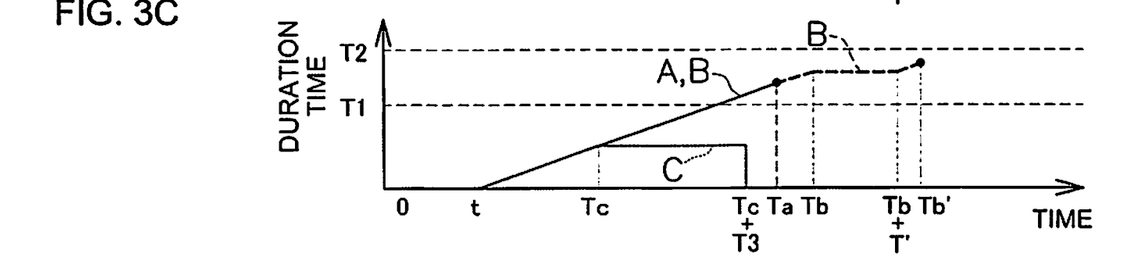
Figure 4A:
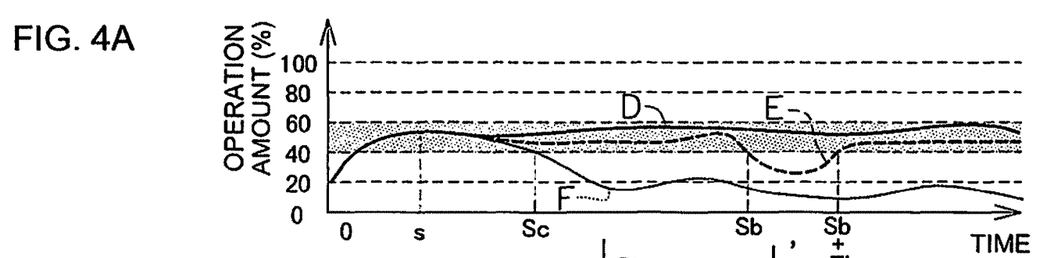
FIGS. 4A-4C include graphs pertaining to the left or right steering brake according to the exemplary embodiment.
Figure 4B:
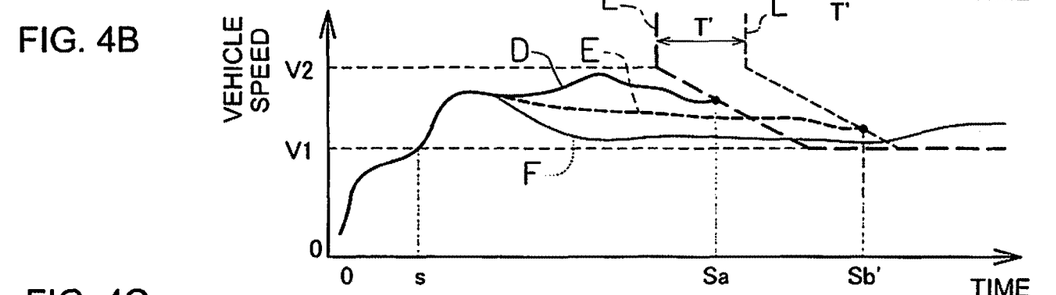
Figure 4C:
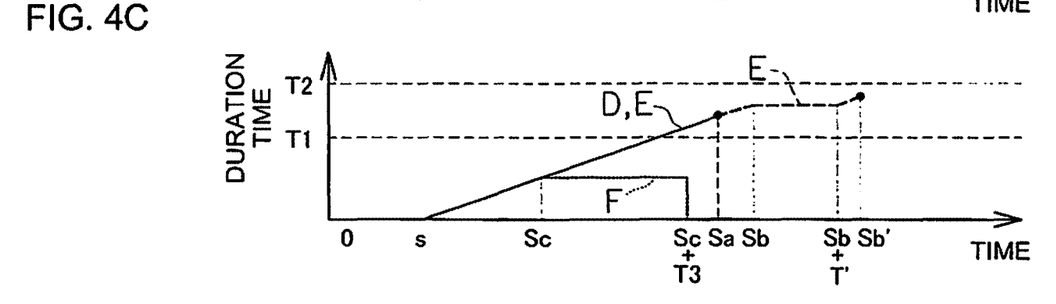

Next, the protection processing of the left and right steering brakes 6a, 6b by the control unit 8 will be explained with reference to the drawings. FIG. 2 is a flow diagram illustrating protection processing of the left and right steering brakes 6a, 6b. FIGS. 3A to 3C are graphs indicating examples of the operation amounts of the left right steering brake 6a or the right steering brake 6b, the vehicle speed, and duration times. FIGS. 4A to 4C are graphs indicating examples of the operation amounts of the left right steering brake 6a or the right steering brake 6b, the vehicle speed, and duration times.

First, in step S1, the control unit 8 determines whether a state of the degree of engagement of the left steering brake 6a or the right steering brake 6b being within a predetermined range and the vehicle speed of the bulldozer 1 being a predetermined vehicle speed V1 or greater, has been established.

The degree of engagement of the left steering brake 6a or the right steering brake 6b is determined on the basis of the operation amount (stroke amount) of the steering operating unit 83. The predetermined range of the operation amount is set to be within the range of the left steering brake 6a or the right steering brake 6b being in the half-engaged state. If the neutral position of the steering operating unit 83 is at 0% and the maximum operating position of the steering operating unit 83 is 100%, the predetermined range of the operation amount can be set to be a range greater than 0% and less than 100%. In the present exemplary embodiment, the predetermined range of the operation amount is set to be 40% or greater to 60% or less as illustrated in FIG. 3A and FIG. 4A.

The predetermined vehicle speed V1 which is a threshold of the vehicle speed is a value greater than zero. The predetermined vehicle speed V1 can be set as appropriate in accordance with the predetermined range of the operation amount in consideration of the thermal load on the left steering brake 6a or the right steering brake 6b.

In step S1, when the state of 40%≤operation amount≤60% and vehicle speed≥V1 is established, the control unit 8 starts counting a duration time of the state and the processing advances to step S2. Because the state of 40%≤operation amount≤60% and vehicle speed≥V1 is reached at the time t in FIGS. 3A and 3B, the counting of the duration time is started at the time t as illustrated in FIG. 3C. Because the state of 40%≤operation amount≤60% and vehicle speed≥V1 is reached at the time s in FIGS. 4A and 4B, the counting of the duration time is started at the time s as illustrated in FIG. 4C. When the state of 40%≤operation amount≤60% and vehicle speed≥V1 is not established in step S1, the processing is finished.

Figure 5:
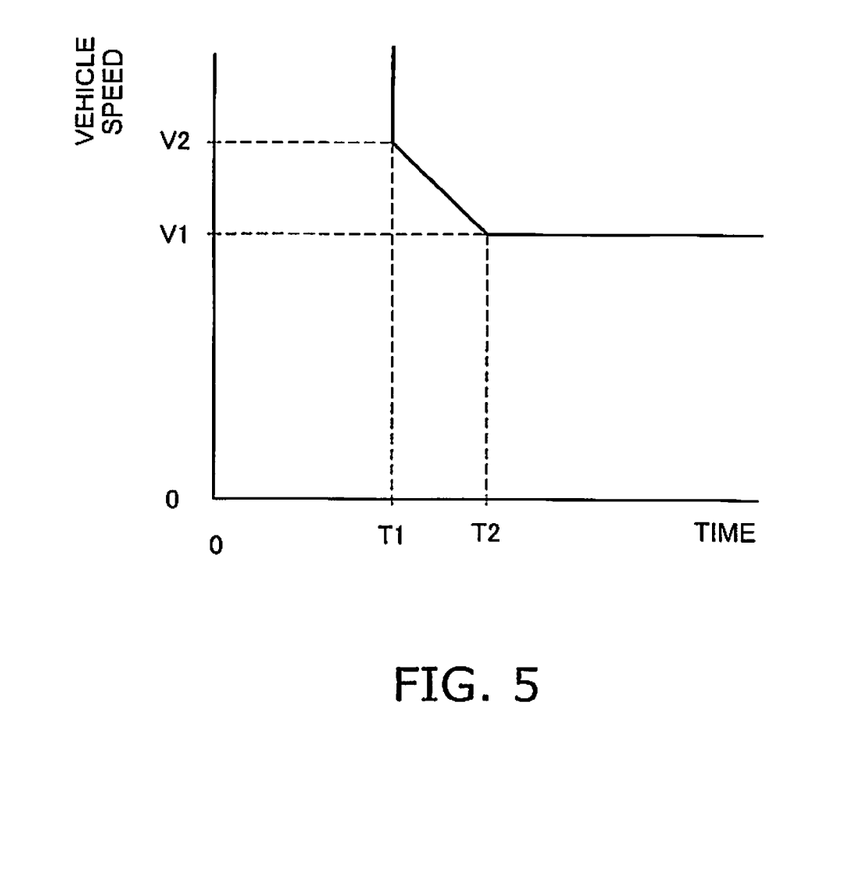
FIG. 5 is a graph illustrating a relationship between the vehicle speed and a predetermined time.

In step S2, the control unit 8 determines whether the state of 40%≤operation amount≤60% and vehicle speed≥V1 has continued for a predetermined time. The predetermined time is decided in response to the vehicle speed of the bulldozer 1. FIG. 5 is an example of a graph illustrating a relationship between the vehicle speed and the predetermined time. As illustrated in FIG. 5, the predetermined time is set to a region in which the vehicle speed is equal to or greater than the predetermined vehicle speed V1 and the time is equal to or greater than a first time T1. The predetermined time is set to be between the first time T1 and a second time T2 and decreases as the vehicle speed increases. The graph in FIG. 5 is displayed as a notification line L in FIGS. 3B and 4B.

In step S2, when the state of 40%≤operation amount≤60% and vehicle speed≥V1 continues for the predetermined time, the processing passes through step S3 and advances to step S4. The notification line L is reached at the time Ta in case A in FIG. 3B because the state of 40%≤operation amount≤60% and vehicle speed≥V1 continues for the predetermined time. The notification line L is reached at the time Sa in case D in FIG. 4B because the state of 40%≤operation amount≤60% and vehicle speed≥V1 continues for the predetermined time.

In step S2, when the state of 40%≤operation amount≤60% and vehicle speed≥V1 does not continue for the predetermined time, the processing advances to step S4. The notification line L is not reached in case B in FIGS. 3A-3C because the state of 40%≤operation amount≤60% and vehicle speed≥V1 has not yet reached the predetermined time at the point in time of the time Ta. The notification line L is not reached in case E in FIGS. 4A-4C because the state of 40%≤operation amount≤60% and vehicle speed≥V1 has not yet reached the predetermined time at the point in time of the time Sa.

In step S3, the control unit 8 executes the protection processing of the steering brake in which the state of 40%≤operation amount≤60% and vehicle speed≥V1 has continued for the predetermined time. Specifically, the control unit 8 issues a notification sound from the notifying unit 22 and displays the notification display on the display 23.

In step S4, the control unit 8 determines whether the state of 40%≤operation amount≤60% and vehicle speed≥V1 is established. In step S4, when the state of 40%≤operation amount≤60% and vehicle speed≥V1 is established, the processing advances to step S2. In step S4, when the state of 40%≤operation amount≤60% and vehicle speed≥V1 is not established, the control unit 8 temporarily stops counting the duration time of the state of 40%≤operation amount≤60% and vehicle speed≥V1 and the processing advances to step S5.

Because the state of vehicle speed≥V1 is no longer established at the time Tb in case B in FIG. 3B, the counting of the duration time is stopped at the time Tb as illustrated in FIG. 3C. Because the state of vehicle speed≥V1 is no longer established at the time Tc in case C in FIG. 3B, the counting of the duration time is stopped at the time Tc as illustrated in FIG. 3C.

Because the state of 40%≤operation amount is no longer established at the time Sb in case E in FIG. 4A, the counting of the duration time is stopped at the time Sb as illustrated in FIG. 4C. Because the state of 40%≤operation amount is no longer established at the time Sc in case F in FIG. 4A, the counting of the duration time is stopped at the time Sc as illustrated in FIG. 4C.

In step S5, the control unit 8 determines whether an extension time T3 has been exceeded since the counting of the duration time was stopped. The extension time T3 can be set to a time when a sufficient drop in temperature of the steering brake subjected to the thermal load is anticipated.

In step S5, when the extension time T3 has been exceeded after the counting has stopped, the processing is finished because the temperature of the steering brake subjected to the thermal load has been sufficiently reduced.

The extension time T3 has been exceeded at the time Tc+T3 after the state of the vehicle speed≥V1 becomes no longer established at the time Tc in case C in FIGS. 3A-3C. The extension time T3 has been exceeded at the time Sc+T3 after the state of the 40%≤operation amount is no longer established at the time Sc in case F in FIGS. 4A-4C.

In step S5, if the extension time T3 has not been exceeded after stopping the counting, the processing returns to step S4 because there is a possibility that the thermal load could increase excessively if the state of 40%≤operation amount≤60% and vehicle speed≥V1 is reestablished. In this case, if the control unit 8 determines that the state of 40%≤operation amount≤60% and vehicle speed≥V1 is reestablished in step S4, the control unit 8 then tallies the elapsed time before the state of 40%≤operation amount≤60% and vehicle speed≥V1 became no longer established and determines whether the state of 40%≤operation amount≤60% and vehicle speed≥V1 has continued for the predetermined time. As a result, even if the state of 40%≤operation amount≤60% and vehicle speed≥V1 is temporarily no longer established, the protection processing in step S3 can be executed in consideration of the heat build-up condition before the state became no longer established.

After the state of vehicle speed≥V1 is no longer established at the time Tb, the state of 40%≤operation amount≤60% and vehicle speed≥V1 is reestablished at the time Tb+T' (where T'<T3) in case B in FIGS. 3A-3C. The notification line L' is reached because the total time of the duration time before the state of vehicle speed≥V1 became no longer established and the duration time after the state of 40%≤operation amount≤60% and vehicle speed≥V1 was reestablished reaches the predetermined time at the time Tb'.

After the state of 40%≤operation amount has become no longer established at the time Sb, the state of 40%≤operation amount≤60% and vehicle speed≥V1 is reestablished at the time Sb+S' (where S'<T3) in case E in FIGS. 4A-4C. The notification line L' is reached at the time Sb' because the total time of the duration time before the state of 40%≤operation amount became no longer established and the duration time after the state of 40%≤operation amount≤60% and vehicle speed≥V1 was reestablished satisfies the predetermined time.

The bulldozer 1 is provided with the left and right steering brakes 6a, 6b for braking the rotations of the left and right drive wheels 17a, 17b, and the control unit 8 for controlling the degree of engagement of the respective left and right steering brakes 6a, 6b. The control unit 8 executes the protection processing of the left steering brake 6a or the right steering brake 6b when the state of 40%≤operation amount≤60% and vehicle speed≥V1 has continued for the predetermined time.

In this way, the thermal load on the left and right steering brakes 6a, 6b can be accurately suppressed because the protection processing on the left steering brake 6a or the right steering brake 6b can be executed in consideration of the duration time of the state of 40%≤operation amount≤60% and vehicle speed≥V1.

The control unit 8 uses the operation amount of the steering operating unit 83 as the degree of engagement of the left and right steering brakes 6a, 6b. As a result, the degree of engagement of the left and right steering brakes 6a, 6b can be understood in a simple manner.

The control unit 8 issues a notification when the state of 40%≤operation amount≤60% and vehicle speed≥V1 has continued for the predetermined time as the protection processing on the left steering brake 6a or the right steering brake 6b. As a result, protection processing (for example, reducing the vehicle speed, changing the operation amount of the steering operating unit 83, or stopping the turning, and the like) performed by the operator can be encouraged. Therefore, in comparison to when the vehicle speed is reduced and the turning is stopped forcefully, the feeling of a sense of unease by the operator during the operation can be suppressed.

The predetermined time that is the basis for executing the protection processing is decided in response to the vehicle speed. As a result, in comparison to the predetermined time being a fixed value, the timing in which the thermal load on the left and right steering brakes 6a, 6b becomes excessive can be understood more accurately.

The control unit 8 tallies the elapsed time before the state of 40%≤operation amount≤60% and vehicle speed≥V1 became no longer established and determines whether the predetermined time has continued when the state of 40%≤operation amount≤60% and vehicle speed≥V1 (example of "second state") is reestablished within the predetermined extension time T3 after the state of 40%≤operation amount≤60% and vehicle speed≥V1 (example of "first state") has become no longer established. As a result, even when the state of 40%≤operation amount≤60% and vehicle speed≥V1 has temporarily become no longer established, the thermal load on the left and right steering brakes 6a, 6b can be suppressed more accurately because the protection processing can be executed in consideration of the heat build-up condition.

The present invention is not limited to the above exemplary embodiment and various changes and modifications may be made without departing from the spirit of the invention.

While the control unit 8 executes the protection processing of the left steering brake 6a or the right steering brake 6b when the state of 40%≤operation amount≤60% and vehicle speed≥V1 has continued for the predetermined time in the above exemplary embodiment, the determination may not be made with respect to the vehicle speed. The control unit 8 may execute the protection processing of the left steering brake 6a or the right steering brake 6b when only the state of 40%≤operation amount≤60% has continued for the predetermined time.

While the degree of engagement of the left and right steering brakes 6a, 6b is determined by the control unit 8 on the basis of the operation amount of the steering operating unit 83, the present invention is not limited in this way. For example, the control unit 8 may determine the degree of engagement of the left and right steering brakes 6a, 6b on the basis of the hydraulic pressure of the hydraulic fluid output from the left and right steering brake control valves 21a, 21b.

While the control unit 8 detects the vehicle speed on the basis of the rotation speed of the output shaft 10a acquired by the rotation speed detecting unit 15 in the above exemplary embodiment, the present invention is not limited in this way. For example, the control unit 8 may detect the vehicle speed on the basis of the rotation speed of the input shaft of the transmission 10, on the basis of the rotation speed of the input shaft 12, or on the basis of the respective left and right output shafts 14a, 14b.

While the control unit 8 issues a notification when the state of 40%≤operation amount≤60% and vehicle speed≥V1 has continued for the predetermined time as the protection processing on the left steering brake 6a or the right steering brake 6b in the above exemplary embodiment, the present invention is not limited in this way. For example, the control unit 8 may cause the rotation speed of the engine 2 to be reduced automatically as the protection processing on the left steering brake 6a or the right steering brake 6b.

While the control unit 8 decides, in response to the vehicle speed, the predetermined time which is the basis for executing the protection processing in the above exemplary embodiment, the present invention is not limited in this way. The predetermined time may be a previously set fixed value.

While the control unit 8 delays the protection processing during the extension time T3 even though the state of 40%≤operation amount≤60% and vehicle speed≥V1 has temporarily become no longer established in the above embodiment, the present invention is not limited in this way. The control unit 8 may finish the protection processing when the state of 40%≤operation amount≤60% and vehicle speed≥V1 has temporarily become no longer established.

While the present invention is applied to a bulldozer as an example of a work vehicle in the above exemplary embodiment, the present invention can be applied also to a hydraulic excavator and the like.

According to the present invention, the present invention is useful in the field of work vehicles because the thermal load on the steering brakes can be suppressed.

What is claimed is:

1. A work vehicle comprising:
   an engine;
   a drive wheel;
   a power transmission device configured to transmit power of the engine to the drive wheel;
   a steering brake disposed between the drive wheel and the power transmission device and configured to brake a rotation of the drive wheel; and
   a control unit configured to control a degree of engagement of the steering brake,
   the control unit being further configured to
      determine if the steering brake is in a half-engaged state in which slippage of the steering brake occurs,
      determine if the steering brake has been in the half-engaged state continuously for a predetermined time, and
      execute protection processing on the steering brake when the steering brake has been in the half-engaged state continuously for the predetermined time.

2. The work vehicle according to claim 1, wherein the control unit is configured to execute the protection processing on the steering brake when a state of the steering brake being in the half-engaged state and a vehicle speed being equal to or greater than a predetermined vehicle speed continues for the predetermined time.

3. The work vehicle according to claim 2, wherein the degree of engagement is determined on the basis of a hydraulic pressure of a hydraulic fluid supplied to the steering brake.

4. The work vehicle according to claim 3, wherein
the control unit is configured to issue a notification that the state of the degree of engagement of the steering brake being within the predetermined range has continued for the predetermined time as the protection processing.

5. The work vehicle according to claim 4, wherein
the control unit is configured to reduce a rotation speed of the engine as the protection processing.

6. The work vehicle according to claim 5, wherein
the predetermined time is decided in response to a vehicle speed.

7. The work vehicle according to claim 6, wherein
when a second state is established in which the degree of engagement of the steering brake being within the predetermined range occurs within a predetermined extension time after a first state in which the degree of engagement of the steering brake being within the predetermined range has become no longer established, the control unit is configured to add a duration time of the first state to a duration time of the second state to determine whether the predetermined time has continued.

8. The work vehicle according to claim 1, further comprising
a steering operating unit for operating the steering brake, the degree of engagement being determined on the basis of an operation amount of the steering operating unit.

9. The work vehicle according to claim 8, wherein
the steering operating unit is configured to be operated between a neutral position and a maximum operating position, the operation amount being defined to be 0% when the steering operating unit is in the neutral position and 100% when the steering operating unit is in the maximum operating position,
the half-engaged state is a state in which the operation amount of the steering operating unit is in a range of 40% to 60%.

10. The work vehicle according to claim 1, wherein
the degree of engagement is determined on the basis of a hydraulic pressure of a hydraulic fluid supplied to the steering brake.

11. The work vehicle according to claim 1, wherein
the control unit is configured to issue a notification that the steering brake has been in the half-engaged state for the predetermined time as the protection processing.

12. The work vehicle according to claim 1, wherein
the control unit is configured to reduce a rotation speed of the engine as the protection processing.

13. The work vehicle according to claim 1, wherein
the predetermined time is decided in response to a vehicle speed.

14. A work vehicle comprising:
an engine;
a drive wheel;
a power transmission device configured to transmit power of the engine to the drive wheel;
a steering brake disposed between the drive wheel and the power transmission device and configured to brake a rotation of the drive wheel; and
a control unit configured to control a degree of engagement of the steering brake, and configured to execute protection processing on the steering brake when a state of the degree of engagement of the steering brake being within a predetermined range continues for a predetermined time,
when a second state is established in which the degree of engagement of the steering brake being within the predetermined range occurs within a predetermined extension time after a first state in which the degree of engagement of the steering brake being within the predetermined range has become no longer established, the control unit is configured to add a duration time of the first state to a duration time of the second state to determine whether the predetermined time has continued.

15. The work vehicle according to claim 14, wherein
the control unit is configured to execute the protection processing on the steering brake when a state of the degree of engagement of the steering brake being within the predetermined range and a vehicle speed being equal to or greater than a predetermined vehicle speed continues for the predetermined time.

16. The work vehicle according to claim 15, wherein
the degree of engagement is determined on the basis of a hydraulic pressure of a hydraulic fluid supplied to the steering brake.

17. The work vehicle according to claim 16, wherein
the control unit is configured to issue a notification that the state of the degree of engagement of the steering brake being within the predetermined range has continued for the predetermined time as the protection processing.

18. The work vehicle according to claim 17, wherein
the control unit is configured to reduce a rotation speed of the engine as the protection processing.

19. The work vehicle according to claim 18, wherein
the predetermined time is decided in response to a vehicle speed.

20. A work vehicle comprising:
an engine;
a drive wheel;
a power transmission device configured to transmit power of the engine to the drive wheel;
a steering brake disposed between the drive wheel and the power transmission device and configured to brake a rotation of the drive wheel;
a steering operating unit configured to operate the left and right steering brakes; and
a control unit configured to control a degree of engagement of the steering brake in response to an operation amount of the steering operating unit, and configured to execute protection processing on the steering brake when a state of the degree of engagement of the steering brake being within a predetermined range continues for a predetermined time,
the steering operating unit being configured to be operated between a neutral position and a maximum operating position, the operation amount being defined to be 0% when the steering operating unit is in the neutral position and 100% when the steering operating unit is in the maximum operating position,
the predetermined range corresponding to the operation amount of the steering operating unit being in a range of 40% to 60%.

* * * * *